Sept. 11, 1962 J. T. KUTNEY 3,053,340
NOISE SUPPRESSION NOZZLE
Filed July 21, 1958 3 Sheets-Sheet 1
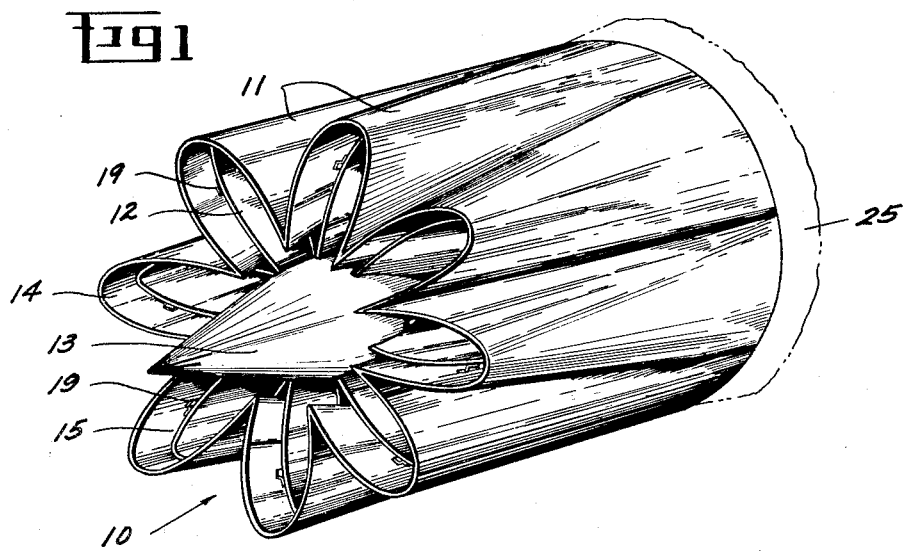
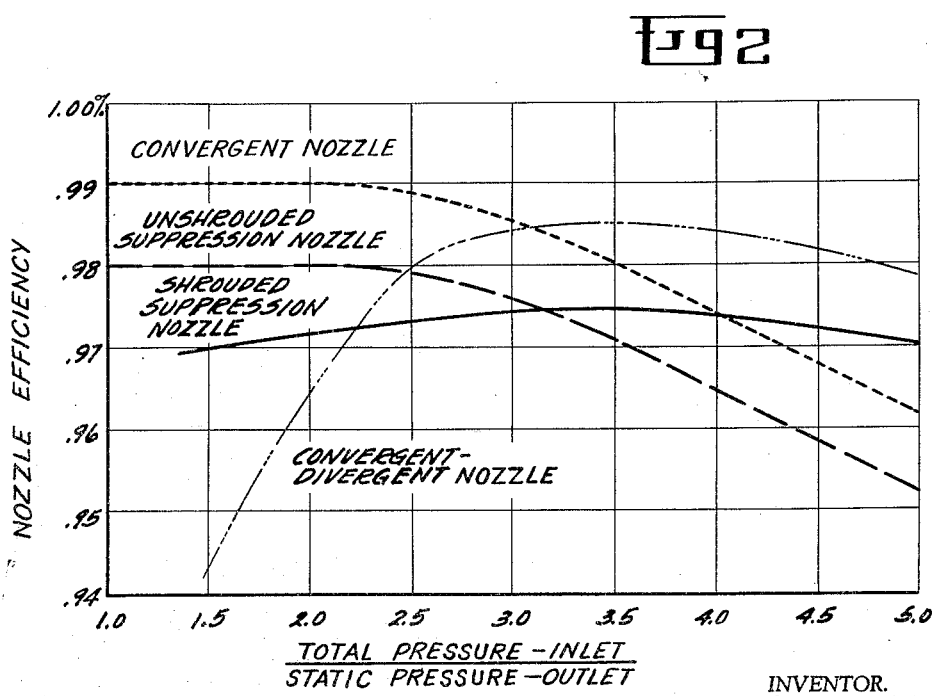
INVENTOR.
JOHN T. KUTNEY
BY Robert B. Crouch
ATTORNEY—

Sept. 11, 1962 J. T. KUTNEY 3,053,340
NOISE SUPPRESSION NOZZLE
Filed July 21, 1958 3 Sheets-Sheet 2
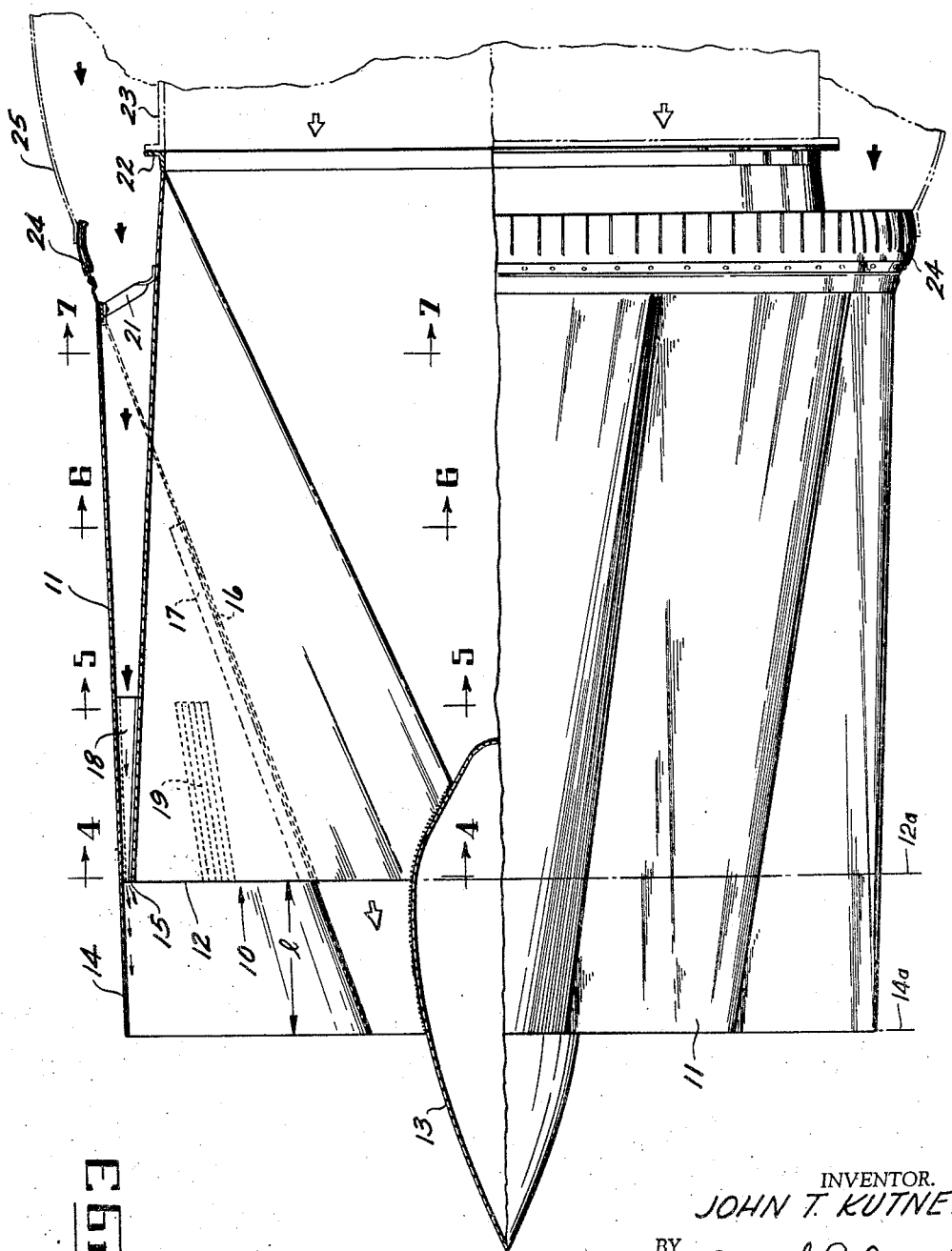
INVENTOR.
JOHN T. KUTNEY
BY Robert B. Crouch
ATTORNEY

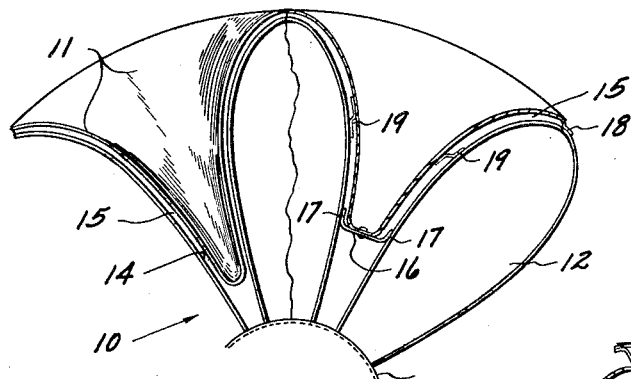
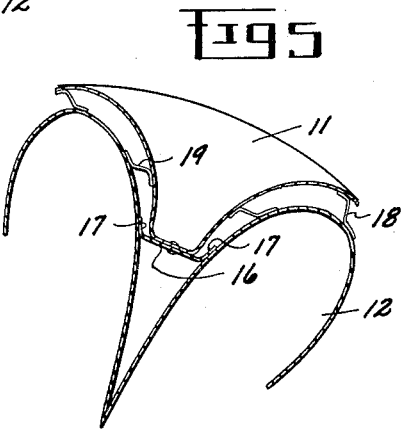
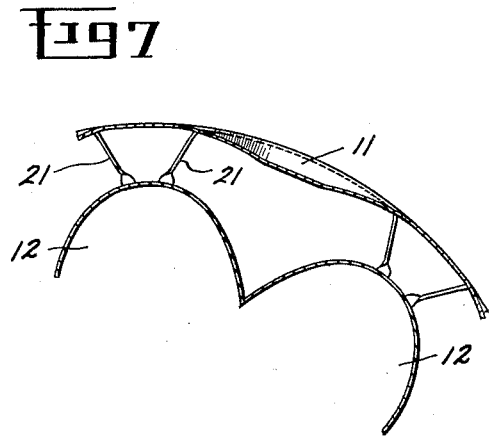
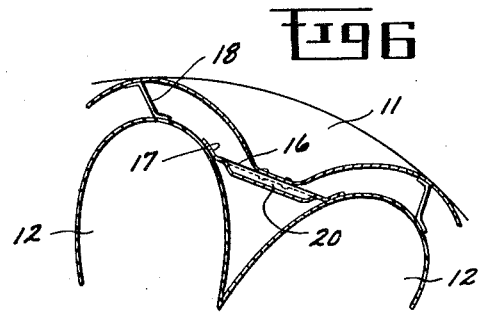
INVENTOR.
JOHN T. KUTNEY

United States Patent Office 3,053,340
Patented Sept. 11, 1962

3,053,340
NOISE SUPPRESSION NOZZLE
John T. Kutney, Silverton, Ohio, assignor to General Electric Company, a corporation of New York
Filed July 21, 1958, Ser. No. 749,745
6 Claims. (Cl. 181—33)

The present invention relates to an exhaust nozzle for a jet engine and more particularly to a high performance noise suppression nozzle for use with an aircraft propulsion system.

It is generally believed that the high level of noise which accompanies discharge of a jet of high pressure gas through a nozzle is caused by the steep velocity gradient which exists across the boundary of the jet with the ambient fluid or atmosphere. This steep velocity gradient causes a high level of noise-producing turbulence in the form of eddys in the boundary of the jet. A known approach to the problem of suppressing such noise has involved reducing the velocity gradient across the boundary of the jet by enlarging the mixing region between the jet and the ambient fluid or atmosphere. A common method of enlarging the mixing region has been to provide corrugations or convolutions in the periphery of the nozzle, thus increasing the peripheral length of the boundary of the jet. Such nozzles have had good noise suppressing qualities, but have not had good performance characteristics, compared with conventional unconvoluted nozzles, when employed as exhaust nozzles for aircraft propulsion jet engines. In such nozzles the convolutions have usually increased the external drag of the nozzle. Also, such nozzles have been relatively inefficient at the higher nozzle pressure ratios (i.e., the ratio of the total pressure at the nozzle inlet to the static pressure at the region of the nozzle outlet) encountered at subsonic cruise conditions of a typical aircraft flight mission. Making the convolutions or equivalent structures adjustable so that they may be retracted from the jet when noise suppression is not needed, may still produce severe thrust losses and external drag when the convolutions or other structures are extended during noise suppression operation. The retractable arrangement is furthermore complicated by actuator requirements and therefore represents a heavy complex system.

An object of the present invention is to provide a simple, functionally reliable high performance noise suppression nozzle for jet engines which has good efficiency even at higher nozzle pressure ratios and also has good external drag characteristics.

To overcome the disadvantageous features of the prior known noise suppressors the present invention provides a high performance noise suppression nozzle comprising a convoluted noise suppressor surrounded by an ejector shroud which generally conforms to the external configuration of the suppressor and which forms the afterbody or outer surface of the nozzle. Secondary air is pumped between the shroud and the suppressor to increase the efficiency of the nozzle.

Other objects and many of the attendant advantages of this invention will be readily appreciated as the same becomes better understood by reference to the following detailed description when considered in connection with the accompanying drawings wherein:

FIG. 1 is a perspective view of a noise suppression nozzle according to the present invention;
FIG. 2 is a series of curves comparing the performance of various types of exhaust nozzles;
FIG. 3 is a plan view partly in section of the noise suppression nozzle of FIG. 1; and
FIGS. 4–7 are partial sectional views taken along lines 4—4, 5—5, 6—6, and 7—7 respectively of FIG. 3.

As shown in FIGS. 1 and 3 of the drawings, the noise suppression nozzle of the present invention comprises a fixed noise suppressor 10 of the so-called "Daisy" type surrounded by an ejector shroud 11. The periphery of the noise suppressor is corrugated or convoluted to provide alternate crests and troughs which form a plurality of radially-directed, petal-like lobes 12. The inward radial depth of the lobes is greatest at the outlet plane 12a of the suppressor and decreases progressively in an upstream direction away from the outlet plane. An elongated streamlined plug 13, having a generally tear drop configuration, may be disposed centrally of the nozzle and attached to the inner extremities of the lobes 12. Thus, the outlet of the noise suppressor is divided into a plurality of small discrete nozzle elements, as best seen in FIGURE 4. The shroud 11 generally conforms to the external configuration of the noise suppressor and is spaced slightly therefrom to define a narrow opening 15 therebetween. As illustrated at 14, the trailing edge of the shroud extends a short distance $l$ beyond the outlet plane 12a of the throat, or minimum area, of the shrouded noise suppression nozzle.

The structural details of how the shroud 11 is supported on the noise suppressor 10 are shown in FIGS. 4–7. The inner extremities of alternate troughs of the shroud are secured to brackets 16. The lateral edges of the brackets are turned-up, as as 17, and secured to the periphery of the noise suppressor between adjacent lobes. The shroud is further supported at the crest and between the crest and trough of each convolution by means of brackets 18 and 19 secured to the inner surface of the shroud and the outer surface of the noise suppressor. Referring to FIG. 6, the bracket 16 may be provided with a reinforcing rib 20 near its upstream edge to prevent flexing of the bracket and consequent displacement of the shroud. As shown in FIG. 7 the upstream or leading edge of the shroud is supported on the crests of the noise suppressor by brackets 21.

Referring to FIG. 3 of the drawing the upstream edge of the noise suppressor is bent outwardly to define a flange 22 by which the suppressor is secured to the tail pipe 23 of a jet engine. The leading edge of the shroud is provided with a flexible sealing section 24 which engages the trailing edge of the engine nacelle 25. Secondary air is picked up at the intake of the engine or at some other convenient point along the nacelle and, as shown by the arrows, flows rearwardly between the nacelle and the engine casing, providing cooling capacity in this region. The secondary air then flows between the shroud and the noise suppressor and is ejected through opening 15.

To reduce the level of the noise created by a jet engine, it has been proposed to reduce the steep velocity gradient across the boundary between the exhaust jet and the surrounding atmosphere. In the present invention, the secondary air ejected through the space between the shroud and the noise suppressor blankets the high velocity exhaust jet with slower moving air. This secondary air serves as a transition section between the high velocity jet and the atmosphere, thus reducing the velocity gradient therebetween. In addition, the noise suppressor of the present invention increases the extent or length of the mixing region between the exhaust jet and the atmosphere by enlarging the periphery of the nozzle by transforming the single large jet into a plurality of smaller discrete jets. The total contact area between the exhaust gas and the atmosphere is thus materially increased. The increased contact area enhances mixing of exhaust gases with the atmosphere and reduces the level of turbulence in the mixing region. The secondary air surrounding the exhaust gases also enhances mixing between the exhaust and the atmosphere, thus further reducing the turbulence level and the consequent noise level. In addition, there is an interference mixing between adjacent discrete jets which are discharged from adjacent lobes of the nozzle. It has been determined that when these adjacent streams mix, the mean turbulence level of both streams combined is less than that of either stream alone. This interference mixing thus serves to further reduce the turbulence and the consequent noise level.

Since a jet engine must operate at different speeds and under widely differing conditions of inlet pressure and temperature during a typical flight mission, the pressure ratio across the exhaust nozzle, i.e., the total pressure at the nozzle inlet as compared with the pressure of the discharge region of the nozzle outlet or exit, varies from a minimum of about 1.5 during minimum thrust conditions (e.g., when the aircraft is "holding" in the landing pattern), to about 4.0 to 1 for subsonic cruise. In the event the aircraft flies at supersonic speeds, the exhaust nozzle pressure ratios are generaly huch higher, i.e., 10–20 to 1. To provide flexibility of efficient operation over the required range of nozzle pressure ratios, the exhaust nozzle must have a high efficiency over the wide range of nozzle pressure ratios.

As is well known, the thrust of a jet engine is directly related to the increase in velocity of the motive fluid passing through the engine. More specifically, thrust will be affected by the velocity increase obtained in the engine exhaust nozzle. Fundamental thermodynamics prove that an increase in velocity can be obtained by passing the fluid through a convergent passage or nozzle. It can also be shown that for pressure ratios across the nozzle of 1.89 to 1 or less (sometimes called the "critical" ratio for air), at the minimum area of such a nozzle the velocity of the fluid will be exactly equal to the local sonic velocity. However, if the pressure at this point has not yet reached the pressure of the discharge region, or ambient, it will be necessary to further expand the gas to realize the energy potential remaining in the gas stream; thus the velocity must increase beyond sonic. This requires that the area of the passage be made to increase downstream of the "critical" or "throat" area. Furthermore, in the case of pressure ratios across the nozzle above approximately 3 or 4 to 1, for optimum thrust increase and maximum efficiency the divergency must be greater to obtain the necessary expansion (pressure drop) in the divergent portion. Therefore, for subsonic operation, generally a convergent type nozzle may be used, since the pressure ratio across the nozzle is seldom greater than 4 to 1. But for high performance jet engines and higher pressure ratios across the nozzle, the nozzle must be designed to operate efficiently at both low and high pressure ratios; therefore, it must be of convergent-divergent design. As illustrated in FIG. 2 the present noise suppression nozzle closely approaches this desired flexibility of efficient performance. That is, the nozzle of the present invention has an efficiency approaching that of a converging nozzle at low pressure ratios, and at high pressure ratios it closely approaches the efficiency of a convergent-divergent nozzle.

The trailing edge of the shroud extends downstream, as at 14, beyond the exit plane 12a of the noise suppressor a distance equal to approximately 0.4 of the diameter of a circle having a cross sectional area equivalent to the total cross sectional area of a lobe 12. The secondary air ejected through opening 15 surrounds the exhaust jet issuing from the noise suppressor lobes and keeps it separated from extension 14 during low pressure ratio operation, thus enabling each individual lobe of the suppressor nozzle to perform as a convergent nozzle element with minimum losses. During operation at higher nozzle pressure ratios, the primary flow tends to expand as it leaves the outlet plane of the suppressor nozzle lobes. The secondary air now will act to confine the primary jet so as to control its expansion. The pressure forces of this expansion are felt in the secondary flow passage and contribute to the system thrust. Without the secondary air, the primary jet would not have a controlled expansion and would not contribute to a thrust increase. The expansion of the primary stream reduces the secondary flow area thereby accelerating the secondary stream, further contributing to the thrust augmentation. Where the inner plug is utilized it provides a mechanical surface with projected area in the axial flow direction. Positive pressure gradients over the plug surface further contribute to thrust increase over the conical nozzle since the plug surfaces act as the divergent walls of a convergent-divergent nozzle. The overall aerodynamic internal performance of the noise suppression nozzle embodies the desirable features of the convergent nozzle at low pressure ratios since losses due to over-expansion are prevented, and the desirable features of the convergent-divergent nozzle at high pressure ratios since controlled expansion of the primary stream is effected. The pumping characteristics of the primary stream provide thrust augmentation by the addition of the mass and velocity (momentum) of the secondary stream.

The shroud of the present invention increases the overall efficiency of the noise suppression nozzle by reducing the boat-tail drag of the noise suppressor. As a jet engine is pushed through the atmosphere the air flows past the exterior of the nacelle and engine. Sharp changes in the external configuration of the nacelle will create drag, since the air will tend to separate from any surface which makes an angle of greater than approximately 15° with the general direction of flight. In this respect, without the shroud, a sharp angle is formed between the trailing edge of the nacelle and the trailing edges of the troughs of the convoluted noise suppressor. Air flowing around the nacelle cannot negotiate this sharp turn and will tend to separate from the troughs of the convolutions, thus creating a negative pressure at subsonic aircraft speeds along these surfaces which create drag on the aircraft. When the shroud is in place on the noise suppressor, the net effective boat-tail angle is reduced since the change of shroud area per unit length is decreased. Accordingly, air flowing around the nacelle will flow smoothly along the shroud and will not separate therefrom. While the troughs of the shrouds are not as deep as the troughs of the suppressor nozzle, the shroud itself must conform generally to the external shape of the noise suppressor. As previously noted, each lobe of the noise suppressor may be treated as a separate nozzle element. The area of the opening 15 and the length of the extension 14 are then properly dimensioned to optimize the "expansion ratio" and "spacing ratio" of each nozzle element, where the "expansion ratio" is the ratio of the area of the noise suppression nozzle exit at 14a to that of the area of the noise suppressor outlet at 12a, the spacing ratio being the ratio of the length $l$ to the diameter of the equivalent circular area of a lobe 12. This requires that the opening 15 be maintained relatively narrow. If it is made too large, the ejector-pump action of the exhaust jet will pump the pressure of the secondary air below what is desired and the primary air of the jet will be over-expanded within the extension 14. This will cause the benefits of the convergent-divergent nozzle to be lost and the nozzle performance will fall below that of a convergent nozzle.

Compared to a conventional convergent nozzle, such as is commonly used with jet engines for subsonic flight, the present high performance noise suppression nozzle prevents a decrease in thrust at higher nozzle pressure ratios and reduces overall drag of the nozzle under all flight conditions. A net thrust increase in the propulsion system is thus afforded.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim is:

1. A high performance noise suppression nozzle for jet engines, comprising: a noise suppressor having a convoluted periphery, the convolutions forming radially-extending petal-like lobes; a central plug secured to the radially inward extremities of the convolutions, the plug and convolutions dividing the outlet of the noise suppressor into a plurality of discrete nozzles; and an ejector shroud surrounding the noise suppressor and conforming generally to the external configuration thereof; supporting means interconnecting said shroud and said suppressor with the jet engine, the shroud being spaced from the suppressor to define a continuous narrow opening therebetween for the discharge of secondary air, the opening extending about the full periphery of the suppressor to provide a blanket of secondary air between the engine exhaust gases and the atmosphere.

2. A high performance convergent-divergent noise suppression nozzle for jet engines comprising: a noise suppressor having a convoluted periphery; an ejector shroud surrounding the suppressor and conforming generally to the external configuration of the suppressor to define a relatively narrow opening therebetween; supporting means interconnecting said shroud and said suppressor; and means for providing secondary air about the periphery of the suppressor, the shroud extending downstream a short distance beyond the suppressor; means located centrally of the suppressor for forming the interior wall of the divergent portion of the nozzle mechanically, the exterior walls of the divergent portion of the nozzle being formed aerodynamically by the secondary air.

3. A high performance convergent-divergent noise suppression nozzle for jet engines comprising: a noise suppressor, the periphery of which is convoluted to form a plurality of lobes; an ejector shroud surrounding the suppressor and conforming generally to the external configuration of the suppressor to define a relatively narrow opening therebetween; supporting means interconnecting said shroud and said suppressor; and means providing a source of secondary air about the periphery of each lobe, the shroud extending downstream a short distance beyond the suppressor; a plug mounted in the interior of the suppressor, the plug forming the interior wall of the divergent section of the nozzle mechanically; the exterior walls of the divergent portion of the nozzle being formed aerodynamically by the secondary air.

4. A high performance convergent-divergent noise suppression nozzle for jet engines comprising: a noise suppressor, the periphery of which is convoluted to form a plurality of lobes; an ejector shroud surrounding the suppressor and conforming generally to the external configuration of the lobes; the shroud being spaced from the lobes to define a narrow opening therebetween; supporting means interconnecting said shroud and said suppressor; and means providing a source of secondary air, the opening extending about the full periphery of the suppressor to provide a blanket of secondary air between the engine exhaust gases and the atmosphere.

5. A high performance convergent-divergent noise suppression nozzle for jet engines comprising: a fixed noise suppressor having a convoluted periphery; an ejector shroud surrounding the suppressor and conforming generally to the external configuration of the suppressor; the shroud being spaced from the suppressor to define a continuous narrow opening therebetween; supporting means interconnecting said shroud and said suppressor; and means providing a source of secondary air, the opening extending about the full periphery of the suppressor to provide a blanket of secondary air between the engine exhaust gases and the atmosphere.

6. A high performance convergent-divergent noise suppression nozzle for jet engines comprising: a noise suppressor having a periphery which is convoluted to form a plurality of radially directed petal-like lobes; an ejector shroud surrounding the suppressor and conforming generally to the external configuration thereof to define a relatively narrow opening therebetween; supporting means interconnecting said shroud and said noise suppressor; means providing secondary air about the periphery of each lobe, the shroud extending downstream a distance equal to approximately .4 of the diameter of the equivalent circular area of a lobe; a plug mounted in the interior of the suppressor, the plug forming the interior wall of the divergent section of the nozzle mechanically; the exterior walls of the divergent portion of the nozzle being formed aerodynamically by the secondary air.

References Cited in the file of this patent

UNITED STATES PATENTS

| | | |
|---|---|---|
| 2,029,337 | Parker | Feb. 4, 1936 |
| 2,382,386 | Arms | Aug. 14, 1945 |
| 2,396,068 | Youngash | Mar. 5, 1946 |
| 2,396,952 | Huber | Mar. 19, 1946 |
| 2,648,353 | Haworth | Aug. 11, 1953 |
| 2,826,895 | English | Mar. 18, 1958 |
| 2,841,955 | McLafferty | July 8, 1958 |
| 2,846,844 | O'Rourke | Aug. 12, 1958 |
| 2,931,169 | Glenn | Apr. 5, 1960 |
| 2,934,889 | Poulos | May 3, 1960 |
| 2,968,150 | Goebel et al. | Jan. 17, 1961 |

FOREIGN PATENTS

| | | |
|---|---|---|
| 366,287 | Great Britain | Feb. 4, 1932 |
| 997,262 | France | Sept. 12, 1951 |
| 202,293 | Australia | July 5, 1956 |

OTHER REFERENCES

Publication: "Noise Control," September 1956, pages 46, 50 cited (entire article pages 46–53, 66).

Publication: Warren J. North, "Transonic Drag of Several Jet-Noise Suppressors," United States National Advisory Committee for Aeronautics, Technical Note 4269 (Washington: NACA, April 1958).